United States Patent
Araullo-McAdams et al.

(10) Patent No.: US 6,710,095 B2
(45) Date of Patent: Mar. 23, 2004

(54) POLYOL CONTAINING GLYCOL ADDUCT FOR USE IN PRODUCING RIGID FOAM

(75) Inventors: Carina Araullo-McAdams, Wilmington, NC (US); John Canaday, Wilmington, NC (US); Kelly Brown, Wagoner, OK (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 10/345,942

(22) Filed: Jan. 16, 2003

(65) Prior Publication Data

US 2003/0149123 A1 Aug. 7, 2003

Related U.S. Application Data

(63) Continuation-in-part of application No. 09/748,626, filed on Dec. 21, 2000, now abandoned.

(51) Int. Cl.[7] .............................................. C08G 18/28
(52) U.S. Cl. ............. 521/172; 252/182.24; 252/182.27; 252/182.28; 252/182.29; 521/131; 521/173
(58) Field of Search .................. 252/182.24, 182.27, 252/182.28, 182.29; 521/131, 172, 173

(56) References Cited

U.S. PATENT DOCUMENTS

| | | |
|---|---|---|
| 4,444,920 A | 4/1984 | Brennan |
| 4,521,611 A | 6/1985 | Magnus |
| 4,526,908 A | 7/1985 | Magnus et al. |
| 4,720,571 A | 1/1988 | Trowell |
| 4,897,429 A | 1/1990 | Trowell et al. |
| 5,470,501 A | 11/1995 | Fishback et al. |
| 5,605,940 A | 2/1997 | Skowronski et al. |

Primary Examiner—John M. Cooney, Jr.
(74) Attorney, Agent, or Firm—Gregory N. Clements

(57) ABSTRACT

A polyol composition containing a polyester polyol, at least 5 weight % of a compatibilizing agent, based on the weight of the polyol and compatibilizing agent, and a hydrocarbon blowing agent. The compatibilizing agent is one or a combination of a benzoate glycol adduct, a substituted benzoate glycol adduct, a naphthenate glycol adduct, a substituted naphthenate glycol adduct, a toluate glycol adduct, or a substituted toluate glycol adduct. The hydrocarbon blowing agent is selected from cyclopentane, isopentane, n-pentane, 2-chloropropane; 1,1,1,2-tetrafluoroethane (HFC-134a); 1,1,1,3,3-pentafluoropropane (HFC-245fa); and n-propylbromide, or mixtures thereof. The compatibilizing agent improves the miscibility of conventional polyester polyols with hydrocarbon blowing agents. The polyol composition can be reacted with a polyisocyanate to form a foam. Foams prepared from the mixture have superior thermal conductivity, lower flammability, and higher stability of the emulsified liquid reactants prior to polymerization.

20 Claims, No Drawings

POLYOL CONTAINING GLYCOL ADDUCT FOR USE IN PRODUCING RIGID FOAM

RELATED APPLICATION

This application is a continuation-in-part of U.S. Ser. No. 09/748,626 filed Dec. 21, 2000 in the name of Carina Araullo-McAdams et al which is now abandoned.

BACKGROUND OF THE INVENTION

1) Field of the Invention

The invention relates to an isocyanate-reactive composition for use in the preparation of rigid polyisocyanurate and/or polyurethane foams. More particularly, the invention relates to an isocyanate-reactive composition which is readily miscible with hydrocarbon blowing agents. The isocyanate-reactive composition contains polyol with at least 5% by weight glycol adducts. Suitable glycol adducts are benzoate, naphthenate, toluate glycol adducts; substituted benzoate, naphthenate, toluate glycol adducts, or a mixture of these.

2) Prior Art

Known rigid polyurethane foams may be prepared by the reaction of a polyisocyanate, an isocyanate-reactive polyol, and a blowing agent in the presence of a catalyst. Polyisocyanurate foams, a variety of polyurethane in which some of the isocyanate components of the reaction mixture are catalyzed to react with themselves, creating strong isocyanurate linkages, can be formed with the polyurethane foams. A variety of polyols may be used for foam preparation, with the particular polyol chosen based on the desired results of the foam or compatibility with other reactants. Polyurethane and polyisocyanurate foams produced by traditional methods have employed chlorofluorocarbons such as trichlorofluoromethane (CFC-11) as the blowing agent. These chlorofluorocarbon compounds are volatized during the exothermic reaction of isocyanate with the polyester polyol. The expanding gas is entrapped within the foam reaction mixture, which polymerizes to form an insulating cellular structure.

Recent studies have shown that the halogen components of chlorofluorocarbon blowing agents, such as CFC-11, deplete ozone in the stratosphere. Hydrochlorofluorocarbons (HCFCs), such as dichlorofluoroethane (141b) and chlorodifluoromethane (HCFC-22), are partially halo-substituted hydrocarbons that have lower ozone depletion potential than the fully halogenated chlorofluorocarbons (CFCs) and have, accordingly, been used as alternative blowing agents for CFC-11 in foam production. But, ever increasing environmental regulation has placed severe burdens and costs upon the users of HCFCs as well as CFCs.

With the heavy regulation of CFCs and HCFCs there has been renewed interest in the use of simple hydrocarbons as blowing agents. Hydrocarbons, such as the isomeric forms of pentane, do not contain halogen components, and are therefore not expected to deplete stratospheric ozone. Hydrocarbon blowing agents have not been favored in the past because of their higher flammability and because of the higher thermal conductivity of the foam produced with the hydrocarbon blowing agents.

More importantly, from a production viewpoint, hydrocarbon blowing agents have limited miscibility with polyester polyols, particularly in the aromatic polyester polyols preferred for making polyurethane and polyisocyanurate insulating foams. Additionally, the low solubility of hydrocarbon blowing agents in polyols, particularly in aromatic polyester polyols, requires that the producer modify his conventional foaming equipment to process these materials. The prior art discloses a variety of materials and methods for compatibilizing blowing agents with a polyol mixture.

U.S. Pat. No. 4,444,920 to Brennan discloses the catalyzed reaction and subsequent transesterification of alkyl p-formylbenzoate from a dimethyl terephthalate (DMT) production process in order to compatibilize the described polyol mixture with a trichlorofluoromethane blowing agent. While Brennan indeed discloses that suitable blowing agents include pentane (as set forth in column 6, line 9), it is clear that Brennan never tested pentane and in fact the invention is based on CFC's. (This is particularly noted in column 4, lines 23–28.)

The Brennan patent reacted, as a preblend, an Eastman waste stream that included methyl p-formylbenzoate (MFB) over a metal alkoxide catalyst to increase the amount of DMT. In the waste stream, Example II (see table atop column 8) shows that after a reaction time of 26 hours the preblend crude waste stream contained 50% (mole percent) DMT, as well as 11% p-methyltoluate, and 14% methylbenzoate, such that they contained 25 mole percent of glycol adducts (11%+14%). In Examples II and III this preblend reaction mixture was reacted with a glycol residue to produce a noncommercial polyol. The mass balance for Examples II and III of Brennan are shown below in Table 1. (The density of methanol is taken to be 0.8 g/ml)

TABLE 1

|  | Example II g | Example III g |
|---|---|---|
| Crude MFB | 64 | 145 |
| Methanol | 200 | 456 |
| Catalyst | 7.3 | 12.4 |
| Magnesol | 7.9 | 15.4 |
| Glycol residue | 103.9 | 235.4 |
| Overhead | −214 | −418 |
| Polyol/glycol adduct | 169.1 | 446.2 |
| Glycol adducts, 25% crude | 16 | 36.25 |
| % glycol adducts in polyol | 9% | 8% |

In Examples II and III, the percent glycol adducts in the noncommercial polyol was 9 and 8% by weight. These noncommercial polyols were then mixed (diluted) with a commercial polyol-Thanex R-350-X to produce the commercial polyol of Brennan. The mass balance in Examples IVB and IVC for the commercial polyols of Brennan is given in Table 2 below. This indicates a final glycol adduct percentage of 2.8% and 2.4% by weight respectively, and it was these polyol/adducts that were blown with Freon® as set forth in Example IV of Brennan.

TABLE 2

|  | Example IVB g | Example IVC g |
|---|---|---|
| Thanol | 24.8 | 25.4 |
| Polyol Ex 2 | 10.6 |  |
| Polyol Ex 3 |  | 10.9 |
| Total | 35.4 | 36.3 |
| Amount of glycol adducts in Polyol (TABLE 1) | 9% | 8% |
| Wt. of glycol adducts | 1.00 | 0.89 |
| % glycol adducts | 2.8% | 2.4% |

U.S. Pat. No. 4,720,571 to Trowell discloses a method of preparing a polyol with improved compatibility with CFC blowing agents by first reacting a mixture comprised of scrap polyethylene terephthalate, dimethyl terephthalate process residue and at least two glycols having a molecular weight higher than that of ethylene glycol, in the presence of an esterification/transesterification catalyst, and subsequently removing glycols from the reaction product.

U.S. Pat. No. 5,605,940 to Skowronski et al. discloses a polyol utilized in the creation of rigid polyurethane foams and polyisocyanurate foams having superior shrink resistance, strength, and long-term insulating ability. The disclosed polyol is, or contains, a hydroxy terminated polyester having an equivalent weight greater than about 350. The disclosed polyol is reacted with isocyanate with or without an additional glycol component. The preferred reactant stream for production of the described polyol contains phthalic acid or ester residues which may be derived from the production of dimethyl terephthalate, scrap polyalkylene terephthalates, phthalic anhydride, residues from the manufacture of phthalic acid, terephthalic acid, and residues from the manufacture of terephthalic acid, isophthalic acid and trimellitic anhydride. The described polyol utilizes hydrogen containing halo-carbon blowing agents such as HCFC's and optionally simple hydrocarbons.

U.S. Pat. Nos. 4,521,611 and 4,526,908 to Magnus describe a polyol composition having phthalic anhydride and a dihydroxy alkylene having two to six carbon atoms; propane diols having the middle carbon substituted with methane components, methanol components, hydroxy components, or hydrogen; or radicals of the formula HO—$(R^3O)_n$—$R^3$—OH, where $R^3$ is an alkylene radical containing two or three carbon atoms and n is an integer from one through three. The foam making process using the disclosed polyol is carried out with excess polyol and limited isocyanate. The disclosed polyols increase the solubility of fluorocarbon blowing agents within the polyol-isocyanate mixture.

U.S. Pat. No. 4,897,429 to Trowell et al. discloses a polyol blend having tall oil fatty acids, dimethyl terephthalate process residue, and polyhydric alcohol components. The components are reacted in the presence of a transesterification catalyst and then reacted with alkylene carbonates or alkylene oxide. The disclosed improved polyol has increased compatibility with chlorofluorocarbon blowing agents. Trowell '602 also discloses an improved polyol blend having tall oil fatty acids.

U.S. Pat. No. 5,470,501 to Fishback et al. discloses an agent which increases the solubility of lightweight hydrocarbons within a polyol mixture. The disclosed agent is an aromatic compound having a first substitution of OH, $NH_2$, COOH, or oxyalkylated addition products thereof, and a second substitution component of $C_6$–$C_{24}$ aliphatic, branched or unbranched, hydrocarbon group. The disclosed agent may be unreacted or reacted with the polyol.

There is a need for an inexpensive and readily available polyol composition containing polyol or polyol mixture, compatibilizing agents, and hydrocarbon blowing agents. There is a further need for a polyol composition which increases the emulsification of hydrocarbon blowing agents within the polyol or polyol mixture while lowering the overall viscosity of the polyol emulsion allowing for improved flowability during the foam reaction process. There is a further need for a polyol composition allowing for emulsification of hydrocarbon blowing agents which maintains the hydrocarbon emulsion for extended periods of time and allows for such a polyol composition to be stored. There is a further need to accomplish the foregoing requirements, without detracting from the overall aromatic content of the resulting polymer. There is a further need to accomplish the foregoing requirements without detracting from the flammability of the resulting polymer. There is a further need to accomplish the foregoing requirements while improving the insulating value (R-value=1/k-factor) of the resulting foam. An invented compound allowing for greater emulsification of hydrocarbon blowing agents within foam making ingredients is further desired in order to reduce the use of ozone depleting CFC's and HCFC's in the traditional foam making processes.

SUMMARY OF THE INVENTION

The improved emulsification of hydrocarbon blowing agents with a polyol or a polyol mixture, the decreased viscosity and stabilization of the polyol/polyol mixture-hydrocarbon blowing agent emulsion, the decrease in flammability, and the improvement in insulating value (R-value) have all been achieved by the invented incorporation of at least 5 wt. % (based on the weight of the polyol and compatibilizing agent) benzoate, substituted benzoate, naphthenate, substituted naphthenate, toluate, or substituted toluate glycol adduct in the production of polyurethane and polyisocyanurate foams. The glycol adduct additives (compatibilizing agent) yield isocyanate-reactive polyols with improved hydrocarbon blowing agent emulsion stability, and the foams produced therefrom have lower thermal conductivity and lower flammability than those prepared from polyols without the compatibilizing agent. The polyester polyol of the invention incorporates the glycol adduct of the named materials as a physical mixture or as a co-reactant with a hydroxy terminated polyester.

The invented compatibilizing agent (glycol adducts) can be produced by esterification reaction of the carboxylic acid (benzoic, toluic, or naphthoic acid), or by the transesterification reaction of the corresponding ester or anhydride, with the glycol. The additive can be conveniently produced by mixing the carboxylic acid, or carboxylic acid derivative (ester or anhydride), with the glycol, reacting the mixture at elevated temperature with agitation, and removing the water and/or alcohol so produced. The molecular weight, free glycol content, acidity, hydroxyl number, and viscosity of the polyester product can be controlled as desired by the molar ratio of the acids (or esters, anhydrides and mixtures thereof) to the glycol or glycol mixture. Reaction stoichiometry can be chosen to provide substantially monoadduct or diadduct product, or any monoadduct to diadduct ratio as desired. Generally, an esterification catalyst is added to the reaction mixture to promote the reaction in a suitable time. Any conventional esterification catalyst or mixtures thereof may be used, such as organo tin catalysts, or a metal catalyst, such as tetraisopropyltitanate.

The polyester polyol are known and commercially available, and may be produced from substantially pure reactant materials, such as DMT or phthalic anhydride, or from side-stream byproducts from the manufacture of phthalic acid, terephthalic acid, dimethylterephthalate, polyethylene terephthalate, isophthalic acid, dimethylisophthalate, naphthalene dicarboxylic acid, or dimethylnaphthalenedicarboxylate, or in combination of pure reactant materials and side stream byproducts. The glycol reactant may also be substantially pure, or as mixed or side-streams derived from the manufacture or purification of ethylene glycol, diethylene glycol, triethylene glycol, polyethylene glycols, or benzyl alcohol, benzene dimethanol, naphthol, butanediol, pentanediol or hexanediol. Similarly, higher functionality triols and tetrols may be incorporated individually or as mixtures with the above glycols, as desired.

The polyurethane/polyisocyanurate foam produced with polyol/polyol mixture, the invented compatibilizing agent, and blown with simple hydrocarbon blowing agents produce foam of superior quality to that known in the prior art. The increased emulsification of the hydrocarbon blowing agent due to the invented compatibilizing agent results in an increase in fine, uniform foam cells which produces foam having an improved insulating value (lower k-value) and lower flammability. The favorable polyol viscosity lowering characteristics of the invented compatibilizing agent result in a polyol emulsion mixture which is easy to manipulate in conventional foam manufacturing equipment. The invented compatibilizing agent also increases the amount of time that a hydrocarbon blowing agent will remain in a stable, unagitated emulsion in a polyol or polyol mixture.

In the broadest sense, the present invention comprises a polyol composition that is polyisocyanate reactive, comprising: at least one polyester polyol, and at least 5 weight % (based on the polyol and the compatibilizing agent) of a compatibilizing agent selected from the group including: benzoate glycol adduct, substituted benzoate glycol adduct, naphthenate glycol adduct, substituted naphthenate glycol adduct; toluate glycol adduct, substituted toluate glycol adduct, or a mixture of these.

DETAILED DESCRIPTION OF THE PREFERRED EMBODIMENTS

The polyol composition of the present invention is reactive with polyisocyanate to produce a polyisocyanurate foam for the building and/or construction industry. The blowable polyol composition comprises a blowing agent, at least 5 wt. % (based on the weight of the blowable polyol) of a compatibilizer, and the polyol itself. Other optional agents such as a fire retardant, surfactant, or coloring agent may be incorporated with the blowable polyol composition. Generally, the blowing agent is in a range of about 10–30 wt. %; the compatibilizing agent is at least 5 wt. % and preferably in a range of 10–25 wt. %; and the polyol is in a range of 45–85 wt. %, all based on 100 wt. % of the blowable polyol composition.

The polyisocyanurate foam produced in accordance with this invention utilizes benzoic acid, toluic acid, and naphthoic acid glycol adducts as compatibilizing agents. As used herein, compatibilizing agents are components that increase the miscibility of a blowing agent with a polyol. More particularly, the described compatibilizing agents increase the polyol miscibility of hydrocarbon blowing agents. As used herein, all descriptions or examples illustrating the use of a benzoic acid glycol adduct also encompass toluic acid glycol adducts, naphthoic acid glycol adducts, and other chemically similar glycol adducts. Suitable compatibilizing agents are selected from the group including: benzoate glycol adduct, substituted benzoate glycol adduct, naphthenate glycol adduct, substituted naphthenate glycol adduct; toluate glycol adduct, and substituted toluate glycol adduct, or a mixture of at least two of these. In order to achieve sufficient miscibility with hydrocarbon blowing agents, the mixture of polyol and compatibilizing agent contains greater than 5 weight percent glycol adducts.

Although similar polyol and foam properties may be produced by physical blends of the compatibilizing agent with conventional polyester polyols, the invented additive is preferably produced concurrently in the reactor, during the production of the polyester polyols. For example, during transesterification of dimethyl terephthalate residue with glycol to produce the polyester polyol, the compatibilizing agent can be concurrently produced by reacting benzoic acid (or toluic acid or naphthoic acid, or the ester equivalent) with glycol to produce the glycol adduct.

The carboxylic acid (or ester equivalents) components and glycol components of the invented glycol adduct interact with the hydroxy terminated polyester polyol in several ways. A carboxylic acid or ester equivalent may bond to a free glycol to form a mono-adduct, two carboxylic acids or ester equivalents may bond to a single free glycol to form a di-adduct, or a carboxylic acid or ester equivalent may bond to a glycol bound to the polyester polyol to form an end group on the polyol.

Particularly suitable components of the invention are aromatic polyesters derived from the reaction of benzoic acid or benzoic acid esters with a free glycol or glycol bound to a polyester polyol:

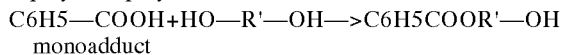
monoadduct

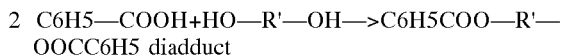
diadduct

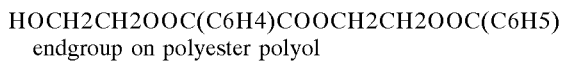
endgroup on polyester polyol

A preferred embodiment is to react the hydroxyl end groups of a hydroxyl-terminated aromatic polyester polyol with the benzoic acid, forming benzoate end groups.

Another preferred embodiment is to react methyl p-toluate with the glycol end groups of the polyester polyol, most particularly a polyester polyol produced from phthalic anhydride and diethylene glycol.

Another preferred carboxylic acid component for use in the invented additive is the methyl ester of p-toluic acid, methyl p-toluate or MpT:

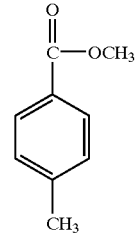

Another preferred carboxylic acid component is naphthalene carboxylic acid.

Preferred glycol components for use in the invented glycol adduct are diethylene glycol, polyethylene glycol, 2-methyl-1,3-propanediol, and 2-naphthol.

Preferred hydrocarbon blowing agents are cyclopentane, isopentane, n-pentane, 2-chloropropane; 1,1,1,2-tetrafluoroethane (HFC-134a); 1,1,1,3,3-pentafluoropropane (HFC-245fa); and n-propylbromide, or mixtures thereof. The preferred range of blowing agent is 1 to 30 weight %. From 0.1 to 5% water, which generates $CO_2$ from the reaction between water and the isocyanate, may be used as a co-blowing agent, the more water used, the less amount of blowing agent is required.

The polyol composition comprises the polyester polyol, the compatibilizing agent, and the hydrocarbon blowing agent. The compatibilizing agent comprises at least 5% by weight of the mixture of the compatibilizing agent and the polyol. Generally the compatibilizing agent does not exceed more than 25% by weight of the mixture of the polyol and the compatibilizing agent, as a practical economic matter.

The polyurethane/polyisocyanurate foams of the invention are prepared by reacting a polyisocyanate ('A-side' component) with a polyol composition containing polyester polyol, the compatibilizing agent, hydrocarbon blowing agent, and optional flame retardant additive (0 to 15 wt. %), catalyst (0.5 to 5 wt. %) and/or surfactant (1 to 4 wt. %) (collectively, the 'B-side' component), such that the ratio of isocyanate equivalents to total polyol equivalents is from about 1.1 to 4.5, wherein the polyol of the invention comprises from about 10% to about 85% of the B-side component.

The polyisocyanate component employed in the foam forming process can be any of the polyisocyanates known to be useful in the art of polymer formation. Typical polyisocyanates include m-phenylene diisocyanate; p-phenylene diisocyanate; polymethylene polyphenylisocyanate; 2,4-toluene diisocyanate; 2,6-tolylene diisocyanate; dianisidine diisocyanate; naphthalene 1,4 diisocyanate; diphenylene-4,4'-diisocyanate; aliphatic-aromatic diisocyanates, such as xylylene-1,4-diisocyanate; xylylene-1,2-diisocyante; xylylene-1,3-diisocyanate; bis(4-isocyanatophenyl) methane; bis(3-methyl-4-isocyanatophenyl) methane; and 4,4'-diphenylpropane diisocyante. A particularly preferred polyisocyanate is the polymeric methyl diphenyl isocyanate (MDI) with a functionality of about 2.7 and a viscosity of about 700 centipoise.

The foam forming mixture contains the invented adduct or mixture of adducts, a polyester or polyether copolyol, a catalyst that will promote the urethane or isocyanurate reaction as desired, a surfactant such as the various silicone or organic surfactants available to the rigid foam industry, the hydrocarbon blowing agent, and, optionally a phosphorus or halogen-containing flame retardant, water, and other additives or fillers as needed for the particular formulation and end use. The above mixture, commonly referred to as the 'B-side' component, is brought together with the polymeric isocyanate or 'A-side' component under conditions of controlled temperature, pressure, and component flow, and intimately mixed by high-pressure impingement. The resulting reacting mixture is then deposited on facing materials or poured into suitable molds for fabrication of the desired finished product.

TEST METHODS

In the following examples, the hydroxyl number was measured in the various components using the ASTM D 4274 standardized testing method. The percent NCO was determined using the ASTM D 1786 standardized testing method. Viscosity was determined by the Brookfield test. The NCO/OH index was determined by calculation. Foam density was determined by ASTM C 303. Thermal conductivity (k-factor) was determined by ASTM C 236, and flammability (the hot plate test) was determined by ASTM D 1692.

As used herein, cream time refers to the time required for foaming to commence in a fully mixed system of the polyol mixture and isocyanate, using the starting materials at 25° C. Tack free time is the time required from initial mixing for the foam to achieve a condition such that an exposed surface thereof is tack free when contacted lightly by a dowel or the like. Gel time is the time at which the foam gives strings of polymer when tested with a dowel or the like. Rise time is the time for the foam to complete foaming.

Comparative Example 1
Conventional Polyester Polyol Synthesis

Example 1 illustrates the preparation of conventional polyester polyols. Weights of the reaction components are shown in Table 1. The components are charged to a reaction flask fitted with a mechanical stirrer, Vigreaux column, reflux condenser, reflux receiver, thermometer well, thermometer and temperature controller, and a nitrogen blanket. Reactor contents were gradually heated to 235° C. while the distillate was collected and weighed. The reaction was terminated after 2–4 hours, when the overhead condenser temperature dropped to <50° C. and the product acid number was less than 1.5. "B side stability" is the stability of the mixture of polyol and blowing agent, with any applicable catalysts, surfactants, or other traditional additives. The emulsion was conditioned at 25° C., using 23 parts of pentane/100 parts of polyol.

TABLE 1

| Example | 1.1 | 1.2 | 1.3 |
|---|---|---|---|
| Component, grams | | | |
| Phthalic Anhydride | 272 | 0 | 0 |
| DMT (dimethyl terephthalate) | 0 | 275 | 0 |
| DMT Residue | 0 | 0 | 275 |
| Diethylene Glycol | 224 | 224 | 232 |
| Tyzor TPT (catalyst) | 1.9 | 1.7 | 1.7 |
| Distillate, grams | 78 | 84 | 76 |
| Hydroxyl Number | 232 | 236 | 251 |
| Viscosity (cp) | 7800 | 8300 | 9450 |
| Acid number | 1.3 | 0.9 | 1.5 |
| Polyol Stability | stable | crystallize | stable |
| B side stability | emulsion | emulsion | emulsion |
| Emulsion stability (1 Hr) | yes | yes | no |
| Emulsion Stability (24 Hr) | no | no | no |

The DMT residue used in Example 1.3 contained a glycol adduct level of 2–3%, comparable to prior art Brennan. This Example 1.3 was not even stable for one hour. This Comparative Example illustrates that current polyols do not have sufficient emulsion stability in hydrocarbon blowing agents.

Conventional Example 2
Conventional Foam Forming Formulation

Example 2 illustrates a conventional foam forming procedure using a hydrocarbon blowing agent, here pentane. Ingredients shown in Table 2 are charged to a suitable container, in the order shown. The pentane mixture is added last, mixed, and adjusted to constant weight. The premixed 'B-side' is then placed in a water bath and adjusted to 25° C. Polymeric isocyanate, also at 25° C., is then added and the total is mixed at 5000 rpm for 8 seconds. After mixing, the material is poured into a suitable mold, and the reactivity times are recorded. Foam is allowed to cure for 24–48 hours, and then cut for physical property testing.

TABLE 2

Terate 2541 is commercially available polyester polyol from KoSa.
TCCP is tris(2–chloropropyl phosphate), a flame retardant

| | | |
|---|---|---|
| Polyol Hydroxyl Number | 240 | |
| Terate 2541 | 100 | parts by weight |
| TCPP | 15 | |
| K-octoate (catalyst) | 4.2 | |
| Polycat-5 | 0.15 | |
| Silicone Surfactant | 2.5 | |
| Water | 0.5 | |
| Pentane | 23 | |
| NCO/OH index | 3.00 | |
| Isocyanate | 209 | |
| Foam reactivity: | | |
| Cream, secs. | 10 | |
| Gel, secs. | 21 | |
| Tackfree, secs. | 28 | |
| Rise time, secs. | 61 | |
| Foam density | 1.85 | |

EXAMPLE 3
Synthesis of Polyols of the Invention

Table 3 shows the physical properties for polyols produced by the procedure shown in Example 1, using conventional polyester polyol synthesis.

TABLE 3

| Polyol Designation | 8256-56-2 | 8256-82 | 8256-86 | 8256-68 |
| --- | --- | --- | --- | --- |
| Parts by weight: | | | | |
| DMT Residue | 1160 | 836 | 711 | 873 |
| Methyl benzoate | 690 | 0 | 0 | 0 |

TABLE 3-continued

| Polyol Designation | 8256-56-2 | 8256-82 | 8256-86 | 8256-68 |
| --- | --- | --- | --- | --- |
| Methyl p-toluate | 0 | 182 | 213 | 0 |
| 2-naphthol | 0 | 0 | 0 | 198 |
| Diethylene glycol | 1773 | 800 | 955 | 654 |
| Tetraisopropyltitanate | 1.8 | 1.2 | 0.7 | 0.8 |
| Total | 3624.8 | 1819.2 | 1879.7 | 1725.8 |
| Reaction Temperature, C. | 230 | 230 | 225 | 225 |
| Reaction Time, hours | 4.00 | 3.75 | 4.75 | 6.00 |
| Distillate, grams | 479 | 230 | 95 | 271 |
| Hydroxyl number, mg.KOH/gr. | 237 | 258 | 251 | 248 |
| Viscosity, cps | 3600 | 2600 | 4500 | 17,500 |
| Acid number, mg.KOH/gr. | 0.9 | 0.3 | 0.3 | 0.6 |
| Emulsion stability (24 Hr) | Yes | Yes | Yes | Yes |
| Foam designation in Example 4 | C | D | E | F |

The physical properties of the polyols produced in accordance with this invention, show improved polyol stability over those polyols produced by traditional methods shown in Example 1. The diethylene glycol was employed for the production of both the polyol and the compatibilizing agent (glycol adduct). The foams produced in Example 4, utilizing the polyols of this example demonstrate dramatically improved properties over comparable foams which do not incorporate polyols produced in accordance with the present invention.

EXAMPLE 4

Table 4 shows the laboratory synthesis and physical properties of foam produced using the polyols of the invention (C, D, E, and F prepared in Example 3).

TABLE 4

| Foam Designation | A | B | C | D | E | F |
| --- | --- | --- | --- | --- | --- | --- |
| Polyol | Terate 2541 | Stepanol 2352 | 8252-56-2 | 8256-82 | 8256-86 | 8256-68 |
| Polyol Hydroxyl Number | 240 | 245 | 237 | 258 | 251 | 248 |
| parts by weight: | | | | | | |
| Polyol | 92.5 | 85 | 92.5 | 92.5 | 92.5 | 92.5 |
| TCPP (Tris 2chloropropylphosphate) flame retardant | 15 | 15 | 15 | 15 | 15 | 15 |
| Potassium Octoate (catalyst) | 4.2 | 3 | 4.2 | 4.2 | 3.5 | 4.2 |
| PMDETA (pentamethyldiethylene triamine) foam catalyst | 0.13 | 0.12 | 0.12 | 0.12 | 0.14 | 0.12 |
| Silicone Surfactant | 2.5 | 2.5 | 2.5 | 2.5 | 2.5 | 2.5 |
| Water | 0.5 | 0.5 | 0.5 | 0.5 | 0.5 | 0.5 |
| Pentane (70% cyclopentane/30% isopentane) | 23.3 | 20.6 | 22.3 | 23.6 | 23.8 | 20.1 |
| NCO/OH index | 3.00 | 3.00 | 3.00 | 3.00 | 3.00 | 3.00 |
| Isocyanate | 196 | 182.9 | 207 | 223 | 213 | 223 |
| B-side viscosity, cps. | 1200 | 1500 | 1200 | 1100 | 1500 | 2200 |
| Emulsion stability, 24 hrs. | yes | yes | yes | yes | yes | yes |
| Foam reactivity: | | | | | | |
| Cream, secs. | 12 | 16 | 11 | 11 | 11 | 9 |
| Gel, secs | 31 | 35 | 21 | 25 | 24 | 23 |
| Tack free, secs. | 41 | 62 | 26 | 30 | 33 | 32 |
| Rise time, secs | 63 | 102 | 53 | 71 | 68 | 65 |
| Foam density, lbs/ft$^3$ | 1.86 | 1.93 | 1.91 | 1.91 | 1.95 | 2.11 |
| Thermal conductivity: | | | | | | |
| k-factor, initial | 0.144 | 0.142 | 0.128 | 0.145 | 0.139 | 0.135 |
| k-factor, aged 90 days | 0.162 | 0.161 | 0.149 | 0.156 | 0.154 | 0.153 |
| Flammability, hotplate test | | | | | | |
| % Dimensional change | −12 | −17 | +4.2 | +4 | 4 | 1.1 |
| % weight loss | 17 | 18 | 18 | 18 | 17.5 | 19 |
| % thickness loss | 14 | 23 | 6 | 6 | 15 | 9 |

The polyol of samples C, D, E, and F include the compatibilizing agent as set forth in Example 3. As shown above, the polyols produced in accordance with this invention (samples C, D, E, and F) produced a blown foam having superior qualities than comparable foams produced from standard polyols (polyols A and B). Foams produced according to the present invention exhibited improved initial and aged k-factors, as well as improved flammability characteristics.

EXAMPLE 5

Flowability Measurements in Foams

Table 5 illustrates the improved flowability of polyols of the invention (foam formulations C and D in Example 3), compared to a conventional control polyol, in foams prepared in the laboratory. Flowability is measured with an ultrasonic rate-of-rise detector (Fomat®, produced by Messtechnik GmbH, of Germany). Flowability is determined by measuring the foam rise height at gelation of the polymer, and dividing this by the total rise height of the foam. A higher percentage of rise height at gelation indicates improved flowability of the liquid chemicals prior to polymerization.

TABLE 5

| Foam Designation | Control | C | D |
|---|---|---|---|
| Polyol | S-2412 | 8256-56-2 | 8256-82 |
| | | parts by weight | |
| Polyol | 100 | 100 | 100 |
| Flame retardant | 0 | 2.5 | 2.5 |
| K-Octoate | 3.2 | 2.8 | 2.8 |
| PMDETA | 0.04 | 0.04 | 0.04 |
| Surfactant | 2.5 | 2.5 | 2.5 |
| Water | 0.5 | 5 | 0.5 |
| Pentane | 22.2 | 21.5 | 21.3 |
| Total | 128.44 | 134.34 | 129.64 |
| Index | 3.00 | 3.00 | 3.00 |
| Polymeric MDI | 207 | 203 | 200 |
| % rise height at gel | 78.0 | 88.4 | 81.8 |

Polyol S-2412 is Stepanol PS-2412 phthalate polyester polyol manufactured by Stepan.

EXAMPLE 6
Commercial Scale Laminator Trial with Polyol of the Invention

Table 6 shows the results of a polyol of the invention, run on a commercial scale laminate foam process. The commercial laminator measures the foam flowability by use of a 'wet' and a % packing factor. The yield density is obtained by dividing the total pounds of foam chemical, as determined by a mass flow meter, into the total cubic feet of laminate board produced. The packing factor is the percentage difference between the foam core density and the 'wet' density. Lower packing factors demonstrate better flow in the foam lamination process.

TABLE 6

| | 8256-56-2 (polyol w/ methyl benzoate additive) | Commercial phthalate polyol |
|---|---|---|
| Target line speed, feet/min. | 95 | 96 |
| Actual line speed, feet/min. | 97 | 98 |
| Board density, lbs/cu. ft | 1.77 | 1.75 |
| Core density, lbs/cu. ft | 1.73 | 1.65 |
| Wet density, lbs/cu. ft | 1.81 | 1.81 |
| Yield, % pack (packing factor) | 4.6 | 9.7 |

EXAMPLE 7
Laboratory Foams Demonstrating Use of 2-Chloropropane Blowing Agent with Polyols of the Invention Table 7 demonstrates the improvement in initial and aged k-factor, flammability and rise height at gelation, for foams produced with polyols of the invention, using 2-chloropropane as the blowing agent. Once again, higher values of rise height at gelation are favorable, while lower values of k-factor and flammability are favorable.

TABLE 7

| Foam designation | Control | C | D |
|---|---|---|---|
| | Stepanol 2352 | 8256-56-2 | 8256-82 |
| | parts by weight | | |
| Polyol | 90.00 | 90.00 | 90.00 |
| Flame retardant | 10.00 | 10.00 | 10.00 |
| K-Octoate | 3.20 | 2.80 | 2.80 |

TABLE 7-continued

| Foam designation | Control | C | D |
|---|---|---|---|
| PMDETA | 0.04 | 0.04 | 0.04 |
| Surfactant | 2.50 | 2.50 | 2.50 |
| Water | 0.50 | 0.50 | 0.50 |
| 2-chloropropane | 21.80 | 21.50 | 21.30 |
| Total | 128.04 | 127.34 | 127.14 |
| Index | 3.00 | 3.00 | 3.00 |
| Polymeric MDI | 207.00 | 203.00 | 200.00 |
| % rise height at foam gelation | 80.0 | 86.7 | 87.4 |
| Thermal conductivity: | | | |
| k-factor, initial | 0.137 | 0.136 | 0.135 |
| k-factor, aged 30 days | 0.153 | 0.143 | 0.143 |
| Flammability, hotplate test | | | |
| % Dimensional change | −6.70 | −0.40 | +7.2 |
| % weight loss | 13.80 | 13.00 | 13.60 |
| % thickness loss foam gelation | 14.00 | 5.90 | 0.50 |

EXAMPLE 8
Use of the Polyester of the Invention as an Additive in the Foaming Process, to Improve Flowability Table 8 demonstrates the use of a polyol prepared in accordance with the invention, as a diadduct to dipropyleneglycol, used as an additive in the foaming process. Data indicates that use of the additive provided better flow in the foaming process as evidenced by lower free-rise and board densities.

TABLE 8

| | parts by weight | |
|---|---|---|
| Terate polyol | 90 | 90 |
| Non-benzoate flow additive | 10 | 0 |
| Benzoate flow additive | 0 | 10 |
| Silicone surfactant | 1.5 | 1.5 |
| Potassium Octoate catalyst | 3.7 | 3.7 |
| Polycat 41 catalyst | 0.3 | 0.3 |
| Polycat 5 catalyst | 0.15 | 0.15 |
| AB-80 flame retardant | 15 | 15 |
| Water | 0.1 | 0.1 |
| Cyclopentane | 17.57 | 17.57 |
| Isopentane | 7.53 | 7.53 |
| Polymeric isocyanate | 183 | 183 |
| Free rise Density | 1.87 | 1.75 |
| % free rise density improvement | Control | 6.86% |
| Board density | 2.09 | 2.00 |
| % board density improvement | Control | 4.50% |

Polycat 41 and Polycat 5 are catalysts produced by Air Products, Inc.
AB-80 is a product of Albright&Wilson It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A polyisocyanate reactive, blowing agent compatible polyol mixture comprising:
   at least one polyester polyol;
   a compatibilizing agent selected from the group including: a benzoate glycol adduct, a substituted benzoate glycol adduct, a naphthenate glycol adduct, a substituted naphthenate glycol adduct; a toluate glycol adduct, a substituted toluate glycol adduct, or a mixture of these, said compatibilizing agent comprising greater than about 5% by weight of said mixture of said polyol and said compatibilizing agent,
   wherein said compatibilizing agent is present in an amount suitable to produce a stable polyol emulsion for 24 hours and be capable of being blown by a blowing agent.

2. The polyol mixture of claim 1, wherein the compatibilizing agent is reacted with the polyol.

3. The polyol mixture of claim 1, wherein the compatibilizing agent and polyol are unreacted.

4. The polyol mixture of claim 1, further comprising: a flame retardant additive.

5. The polyol mixture of claim 1, further comprising: a surfactant.

6. The polyol mixture of claim 1, further including a blowing agent selected from: cyclopentane, isopentane, n-pentane, 2-chloropropane, 1,1,1,2-tetrafluoroethane (HFC-134a), 1,1,1,3,3-pentafluoropropane (HFC-245fa), and n-propylbromide, or mixtures thereof.

7. The polyol mixture of claim 1, wherein said glycol component of said adduct is selected from: diethylene glycol, polyethylene glycol, 2-naphthol, and 2-methyl-1,3-propanediol.

8. The polyol mixture of claim 1, wherein the additive is selected from: methyl p-toluate glycol adduct and naphthalene carboxylic acid glycol adduct.

9. A polyol suitable for reacting with polyisocyanate comprising:
   at lease one polyester polyol;
   a compatibilizing agent selected from the group including: a benzoate glycol adduct, a substituted benzoate glycol adduct, a naphthenate glycol adduct, a substituted naphthenate glycol adduct, a toluate glycol adduct, a substituted toluate glycol adduct, and a mixture of these, said compatibilizing agent comprising greater than about 5% by weight of said polyester polyol and said compatibilizing agent.

10. The polyol of claim 9, wherein the compatibilizing agent is reacted with the polyol.

11. The polyol of claim 9, wherein the compatibilizing agent and polyol are unreacted.

12. The polyol of claim 9, wherein the reaction product further comprises a flame retardant additive.

13. The polyol of claim 9, wherein the reaction product further comprises a surfactant.

14. The polyol of claim 9, further including a blowing agent selected from the group comprising: cyclopentane, isopentane, n-pentane, 2-chloropropane, 1,1,1,2-tetrafluoroethane (HFC-134a), 1,1,1,3,3-pentafluoropropane (HFC-245fa), and n-propylbromide, or mixtures thereof.

15. The polyol of claim 9, wherein glycol from said benzoate glycol adduct, substituted benzoate glycol adduct, naphthenate glycol adduct, substituted naphthenate glycol adduct, toluate glycol adduct, or substituted toluate glycol adduct, is selected from the group comprising: diethylene glycol, polyethylene glycol, 2-naphthol, and MP diol®.

16. The polyol of claim 9, wherein said substituted toluate glycol adduct is methyl p-toluate glycol adduct.

17. The polyol of claim 9, wherein said naphthenate glycol adduct is naphthalene carboxylic acid glycol adduct.

18. A polyisocyanate foam, comprising:
   isocyanate, polyester polyol, at least 5 weight % compatibilizing agent, and a blowing agent,
   wherein said compatibilizing agent is selected from the class consisting of benzoate glycol adduct, substituted benzoate glycol adduct, naphthenate glycol adduct, substituted naphthenate glycol adduct; toluate glycol adduct, and substituted toluate glycol adduct, or a mixture of at least two of these.

19. The polyisocyanate foam of claim 18, wherein said isocyanate is selected from the class comprising m-phenylene diisocyanate; p-phenylene diisocyanate; polymethylene polyphenylisocyanate; 2,4-toluene diisocyanate; 2,6-tolylene diisocyanate; dianisidine diisocyanate; naphthalene 1,4 diisocyanate; diphenylene-4,4'-diisocyanate; aliphatic-aromatic diisocyanates, such as xylylene-1,4-diisocyante; xylylene-1,2-diisocyante; xylylene-1,3-diisocyanate; bis(4-isocyanatophenyl)methane; bis(3-methyl-4-isocyanatophenyl)methane; and 4,4'-diphenylpropane diisocyante.

20. The polyisocyanate foam of claim 18, wherein said blowing agent is selected from the class consisting of cyclopentane, isopentane, n-pentane, 2-chloropropane; 1,1,1,2-tetrafluoroethane (HFC-134a); 1,1,1,3,3-pentafluoropropane (HFC-245fa); and n-propylbromide, or mixtures thereof.

* * * * *